United States Patent [19]

Lockwood et al.

[11] 4,377,294
[45] Mar. 22, 1983

[54] VEHICLE FENDER AND SUPPORT BAR

[75] Inventors: James R. Lockwood; Kenneth Leffel, both of Wapakoneta; Joseph A. Ferrante, Maumee, all of Ohio

[73] Assignee: Lancaster Colony Corporation, Columbus, Ohio

[21] Appl. No.: 244,626

[22] Filed: Mar. 17, 1981

[51] Int. Cl.³ .............................................. B62D 25/16
[52] U.S. Cl. ........................... 280/154.5 R; D12/185; 411/221; 411/401
[58] Field of Search ............... 280/154, 152 R, 153 R, 280/154.5 R, 156; D12/185; 24/276; 411/221, 401

[56] References Cited

U.S. PATENT DOCUMENTS 3,337,238  8/1967  Weasel, Jr. .................. 280/154.5 R
4,148,373  4/1979  Cline ........................... 280/154.5 R

*Primary Examiner*—Joseph F. Peters, Jr.
*Assistant Examiner*—M. J. Hill
*Attorney, Agent, or Firm*—Robert E. Stebens

[57] ABSTRACT

A fender and support bar is provided for automotive vehicle wheel sets. The fender comprises a panel having a support seat formed thereon intermediate its longitudinal ends and the support comprises an elongated tube which is rigidly connected to the panel. The rigid mechanical connection is provided by pairs of clamping plates disposed at opposite sides of an inner wall of the support bar and a wheel set facing surface of the fender panel. A plurality of clamping bolts are positioned along the elongated clamping plates and the heads of these bolts are secured to that clamping plate inserted within the interior of the tube to facilitate assembly. Mounting of the support bar in supported relationship to a vehicle chassis is by a telescopic sleeve assembly utilizing compression clamps to obtain a fixed position connection.

17 Claims, 7 Drawing Figures

VEHICLE FENDER AND SUPPORT BAR

FIELD OF THE INVENTION

This invention relates in general to fenders and support bars or tubes for such fenders that are attachable to automotive vehicles of the truck type. Such truck vehicles are generally of a type having dual drive wheels in the form of wheel sets that are not generally provided with a protective fender structure. The vehicle fenders of this invention are of a type which are designed to extend around a partial periphery of a wheel and are customarily designated as quarter fenders.

BACKGROUND OF THE INVENTION

Truck type vehicles such as the dual drive wheel type are not generally provided by the manufacturer with fender structures for those rear drive wheels. Such vehicles are normally provided in a basic form without a cargo carrying body or van body or may be of the type that are designated as tractors designed for use with semi-trailers. In the case of those trucks which are ultimately incorporated with integral van-type bodies, such structures may then incorporate a wheel well and integral fender structure, thus, inherently providing the necessary protection as against materials that are otherwise thrown from the periphery of the wheel, particularly water spray and small rocks.

Many other truck type vehicles having otherwise exposed drive wheel sets, either as single or tandem sets, are not readily susceptible to a providing of integral fender structures with a truck body. This is particularly true with respect to those vehicles that are used with semi-trailers. Accordingly, in order to meet basic safety requirements whether obligated by statute or vehicle regulations, it has become necessary for such vehicle operators to independently provide protective fenders of at least a partial type to minimize throwing of excessive water spray and rocks which may be hazardous to other vehicles following a truck or which may be passing such a vehicle.

A basic example of a quarter fender that has been available to meet the general objectives of protection relative to drive wheel sets of a truck is illustrated in U.S. Pat. No. Des. 205,137 granted June 28, 1966 to George Weasel, Jr. Such a quarter fender comprises an arcuately curved panel which may be formed with longitudinally extending side flanges. Across the outwardly facing surface of the panel, a seat is formed for receiving a support bar of a tubular type that is designed to mount the quarter fender onto a vehicle chassis.

The general mounting of such quarter fenders utilizes a tubular support bar, such as an elongated cylindrical tube, and includes a U-bolt type of attachment as between the bar and the quarter fender. This is better illustrated in the structures shown in the drawings of U.S. Pat. No. 3,922,003 issued Nov. 25, 1975 to Harlan L. Lea and No. 4,205,861 issued June 3, 1980 to Frederick D. Roberts. These two patents clearly illustrate the basic concept of positioning an elongated cylindrical tube transversely across a quarter fender of this type and then securing that tube to the fender by means of the U-bolts. These U-bolts extend over the top of the cylindrical tube and project through the panel with the opposite ends being secured by threaded nuts.

In each instance of the attachment as shown in the noted patents, there is no direct positive mechanical interconnection as between the support tube and the quarter fender. This support relies upon a frictional engagement as between the inner radius of the U-bolts and contacting portions of either a support seat, as shown in Pat. No. 3,922,003, or merely the relatively small contacting surface of the fender panel as shown in Pat. No. 4,205,861. This engagement and contacting surface area is of a nominal nature and as a consequence, the fender has a substantial tendency to be radially displaced about its support tube.

Another mounting technique heretofore frequently employed comprises a plurality of thru-bolts passing diametrically through the tube and the fender panel. Since this mounting is inherently incapable of resisting oscillation of the fender about what is essentially a line contact, a plurality of strap-form braces are also provided. Each brace has one end secured to the tube by a respective thru-bolt diametrically opposite to the fender contact and extends transversely to the tube with the opposite end then being independently secured to the fender by a respective bolt. This is a relatively expensive mounting and is not particularly structurally sound as well as having an unsightly appearance.

SUMMARY OF THE INVENTION

The quarter fender and cylindrical support bar or tube embodying this invention incorporates a construction wherein there is a direct and positive mechanical connection at the interface of that bar to the fender panel. In the illustrated embodiment, this connection is by means of bolts that extend through adjacent surface or wall portions and such a connection completely eliminates the likelihood of any relative rotation as between the support tube and the panel. Mounting of the support bar onto a vehicle chassis is accomplished by a telescopic sleeve arrangement which forms an extremely secure clamped arrangement wherein the frictional forces that are developed are completely adequate to prevent relative rotation of the support tube and thus maintain the quarter fender in a desired position with respect to the wheel set for which it is desired to provide protection.

The fixed mechanical mounting of the support bar which is a cylindrical tube and the fender which includes a sheet-form panel is effected by a plurality of bolt-type fastening devices. To better assure that there will be a strong mechanical interconnection between the relatively thin walled components, a pair of clamping plates are provided in this assembly. These clamping plates are formed with curvatures to match respective adjacent wall surfaces as to the inner surface of the support tube and an outer surface of the panel which is formed with a mounting or support seat for the tube. Providing of a seat having a minimum of 80 degrees of contact or bearing surface assures that there will be little tendency for the quarter fender panel to oscillate about the support tube at their point of direct interconnection by means of mechanical bolts passing through the superposed clamping plates, tube wall and panel and torqued to a predetermined value to assure optimum holdin force.

A telescopic sleeve-type mounting structure is provided at one end of the support bar for attachment of the unit on the vehicle chassis. This telescopic sleeve mechanism includes a cylindrical mounting bar that interfits within the interior of the cylindrical support tube. The support tube is formed with a longitudinal slot so that application of a circumferential clamping force to the tube will collapse that tube into contacting engagement around substantially the entire periphery of the mounting bar and form an extremely secure frictional engagement therewith to prevent either axial or rotational displacement. The telescopic tube permits proper angular positioning of the fender with respect to the wheel set as well as axial displacement for proper transverse positioning relative to a supporting vehicle chassis or frame.

These and other objects and advantages of this invention will be readily apparent from the following detailed description of embodiments thereof and by reference to the accompanying drawings.

DESCRIPTION OF THE DRAWING FIGURES

DESCRIPTION OF THE ILLUSTRATIVE EMBODIMENTS

Figure 1:
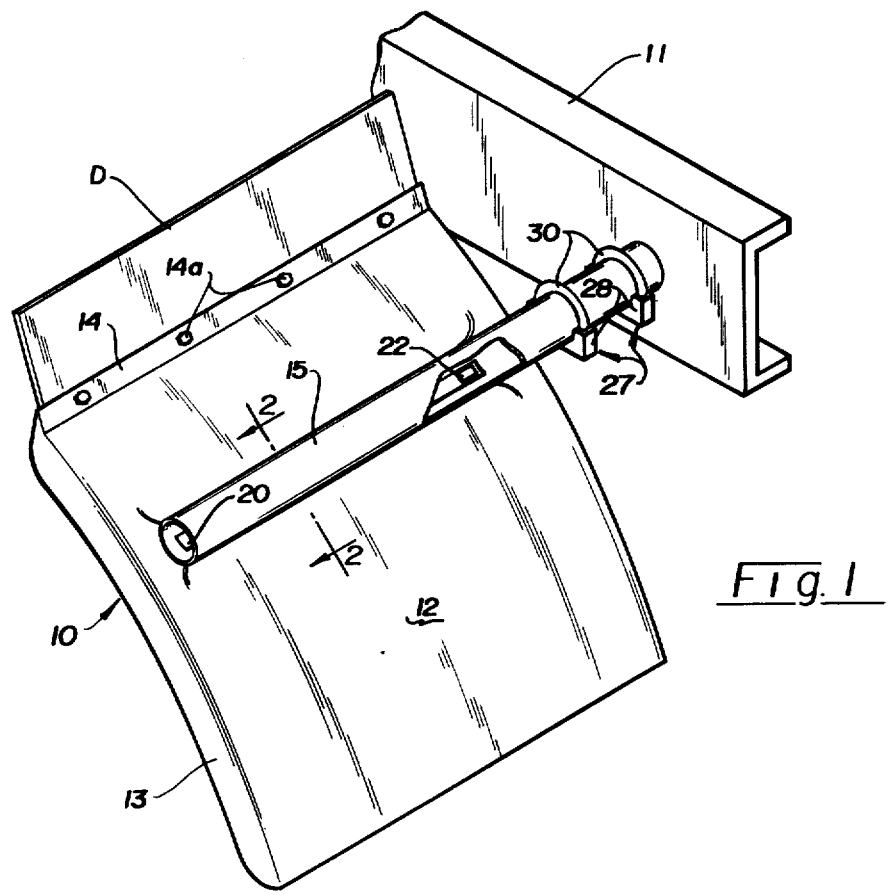
FIG. 1 is a perspective view of a fender and support tube embodying this invention and shown mounted on an element of a vehicle chassis frame with portions thereof broken away for clarity of illustration.

Having reference to FIG. 1, a quarter fender 10 of the type with which this invention is related is shown as diagrammatically mounted in supported relationship to an element of a vehicle chassis 11. This element of the vehicle chassis 11 is illustrated as comprising a C-shaped channel and would constitute a part of the primary frame structure which is disposed at a point slightly inward of a wheel set. The wheel set is not illustrated as the configuration thereof and its relationship to the quarter fender is well-known as is indicated in prior patents.

The quarter fender 10 as illustrated in FIG. 1, and in the related sectional views 2, 3 and 4, comprises a relatively rigid sheet metal panel 12 having a generally arcuate configuration in a longitudinal direction. The panel is of a width to extend transversely across the particular wheel set with which it is designed to be utilized, and thus, in the case of a dual wheel set, may be of the order of 18 inches in width. Each of the longitudinal sides of the panel is provided with an inturned flange 13 to improve the ability of the fender to collect thrown material, such as water spray and rocks, and direct such material in a downward direction toward the roadway. Additionally, a quarter fender of this type is designed to be provided with an additional deflector element D which may be formed from a rubber-like material. Such an additional deflector is mounted transversely across an upper end of the panel and for this purpose, the panel is thus provided with a transversely extending mounting flange 14 that is provided with a plurality of transversely spaced apertures for respective attachment bolts 14a.

Mounting and support of the fender 10 on the vehicle chassis is effected by a support bar 15 that is a cylindrical tube and which is of a length to extend substantially across the fender and project a distance laterally outward from one side edge thereof. The length of the support bar is such that the terminal end of the laterally projecting portion will be disposed closely adjacent the vertical surface of the supporting vehicle chassis element 11 when the fender is properly aligned with the wheel set. A support seat 16 is provided in the panel 12 to partially receive the tubular support bar 15. This support seat 16 is of an arcuately curved channel configuration and, in the case of the fender panel 12 being formed from a metal sheet, is readily formed in an integral manner with that panel. Thus, the panel is formed with two transversely extending ribs 17 which project outwardly from the outer face of the panel and cooperatively define an arcuately curved support seat channel. In this particular embodiment, the support tube 15 comprises a relatively thin walled sheet metal tube having a nominal diameter of the order of 2 inches and the radius of curvature of the support seat 16 is substantially the same with the contacting interfacing surfaces including an arc of the order of 80 degrees. Thus, the tube 15 will securely nest within this channel and be effectively restrained against lateral oscillations by the upstanding transverse ribs 17.

Figure 3:
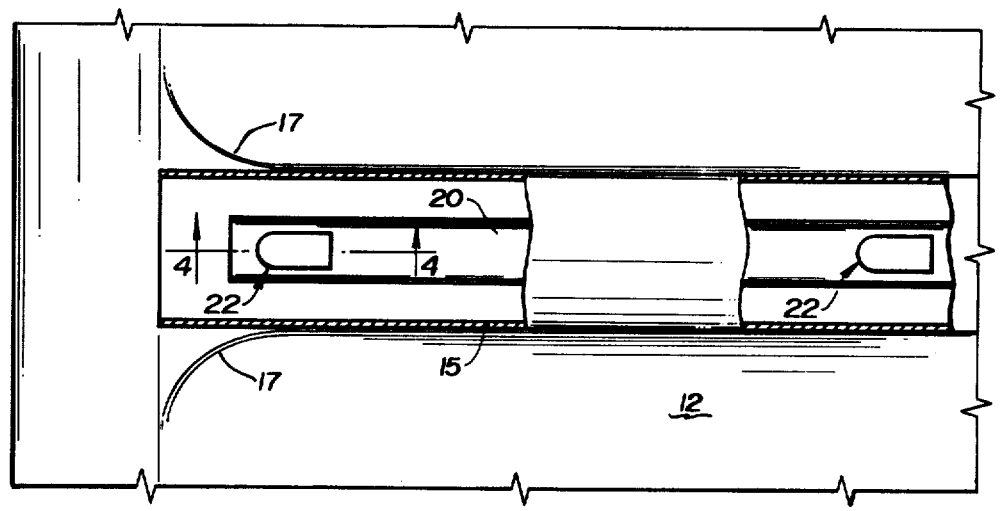
FIG. 3 is a fragmentary sectional view taken along line 3—3 of FIG. 2.
Figure 4:
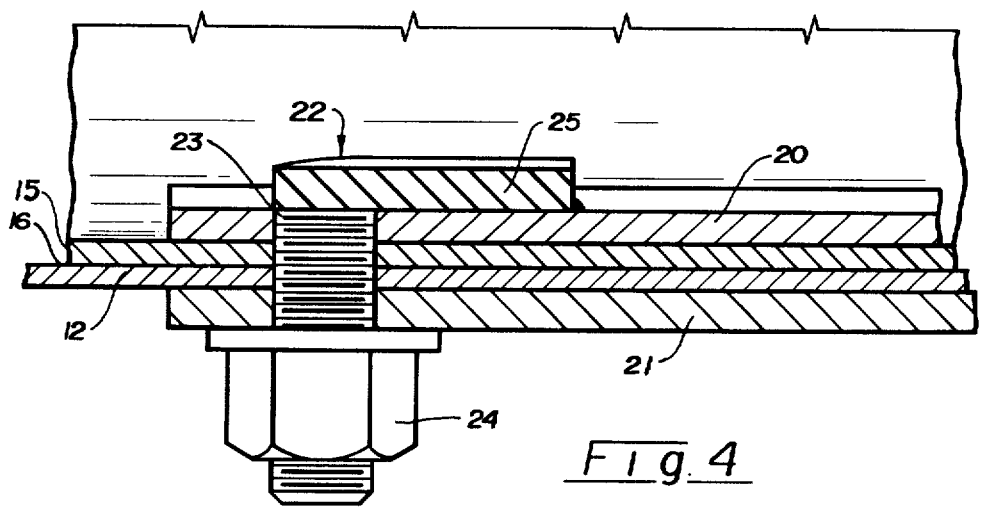
FIG. 4 is a fragmentary vertical sectional view on a substantially enlarged scale taken along line 4—4 of FIG. 3.

In accordance with this invention, the support tube 15 is mechanically connected with the fender 10 by novel means to eliminate the U-bolt type clamping devices heretofore utilized and which have not been found entirely satisfactory. This mechanical interconnection to form a rigid unitary structure is obtained through connecting means which can be best seen by reference to FIGS. 2, 3 and 4. In general, this connecting means comprises a pair of clamping plates that are respectively identified as the inner-clamping plate 20 and outer clamping plate 21 disposed in cooperative relationship with the support tube 15 and panel 12, and a plurality of fastening devices for securing the elements in rigid engagement. Each of the clamping plates 20 and 21 comprises a rigid metal plate which is of a length substantially equivalent to the width of the panel 12. As can be best seen in FIG. 3, the inner clamping plate 20 thus terminates a slight distance inwardly of the one illustrated terminal end of a support bar 15. The opposite end of the plate 20 terminates at a point which will be slightly inward of the opposite longitudinal side edge of the panel as is shown in FIG. 1. Similarly, the outer clamping plate 21 is of the same length and terminates at essentially the same illustrated and described points with respect to the inner clamping plate.

Figure 2:
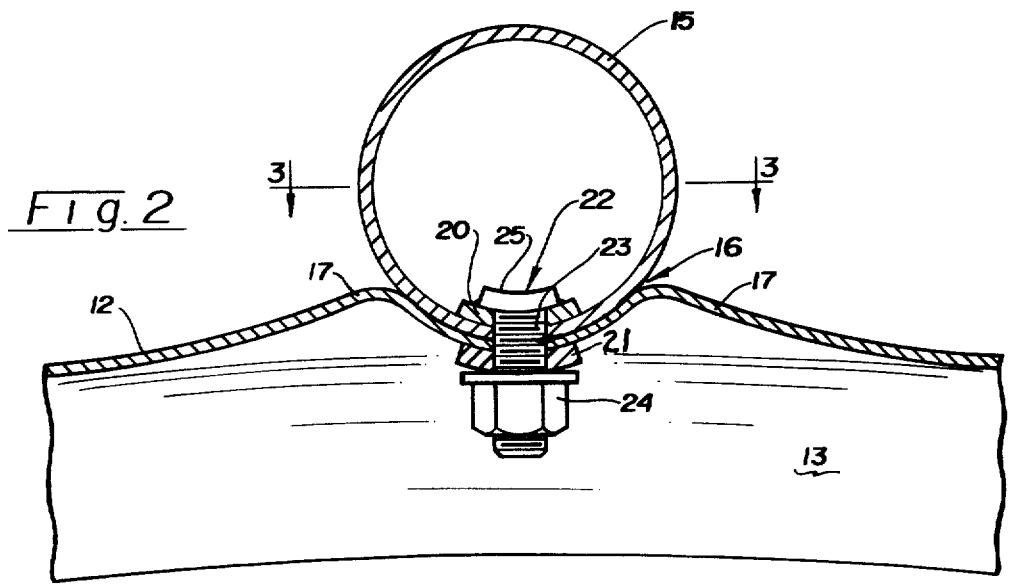
FIG. 2 is a fragmentary vertical sectional view on an enlarged scale taken along line 2—2 of FIG. 1.

It will also be noted, particularly with reference to FIG. 2 that each of the clamping plates 20 and 21 is formed with a transverse curvature which is essentially complementary to either the respective inner wall surface of the tubular support tube 15 or the surface of the panel facing the wheel sets of the vehicle. For convenience of manufacture, these two plates have essentially the same curvature and will effectively interfit in contacting engagement with the surfaces of the respective components as indicated in FIG. 2 and form a secure clamping engagement relative to those components. It will also be noted that the two clamping plates do not have a width which is co-extensive with the interengaging portions of a support tube 15 and the support seat surfaces 16. However, these plates are of a sufficient width to provide an adequate bearing surface to accommodate fastening devices 22 and to extend over sufficient portions of the respective walls to provide a necessary mechanical and structural rigidity.

In the illustrative embodiment, the fastening devices 22 comprise an elongated shaft or rod having a securing element engageable with one end thereof and are shown as cooperatively threaded bolt and nut elements which are respectively indicated by the numerals 23 and 24. The bolts 23 in this structure are advantageously of a type designated as a weld bolt and each has a head 25 which is relatively elongated as can be best seen in FIGS. 3 and 4. Such an elongated head provides a convenient means for securing such a bolt as by welding to an associated structural component such as the inner clamping plate 20 in this instance. Securing of the bolts 23 to the inner clamping plate assures that the bolts and clamping plates may be readily assembled with the structure in securing the support tube 15 to the panel 12. The length of the bolts 23 are of a dimension such that the assembled and welded bolt and clamping plate may be axially inserted through the central area of the support bar 15 and when in proper axial position, may be readily manipulated from the open end of the support tube to cause the bolts to extend through aligned apertures formed in the various components. Once the inner clamping plate is positioned as indicated in FIG. 2, the outer clamping plate 21 may be applied and positioned over the outwardly projecting ends of the bolts and the respective nuts 24 then applied to result in a rigid mechanical connection of the support bar and the panel. It will also be noted with respect to FIG. 2 that the heads 25 of the bolts are preferably is configured to have a base surface arcuately curved for better mechanical interfit with the opposed surface of the inner clamping plate 20. However, for economic reasons, the bolts 23 may be formed with flat surfaces (not shown) without affecting their performance.

Figure 5:
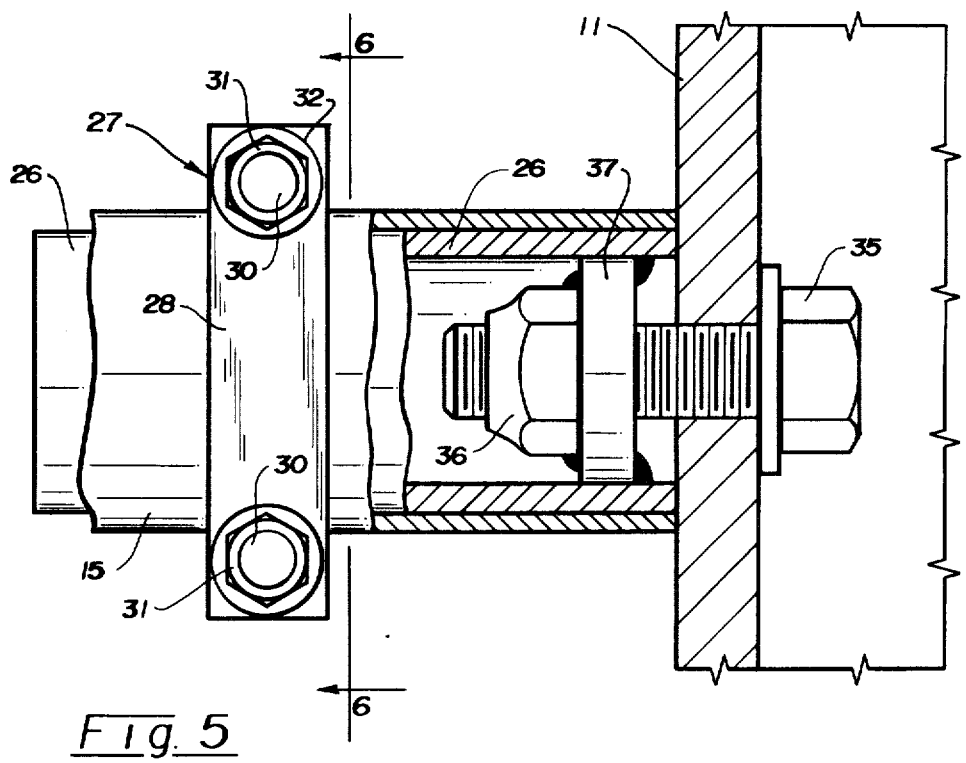
FIG. 5 is a fragmentary, partially sectioned bottom plan view on an enlarged scale of the chassis mounting and terminal end portion of the support tube.
Figure 6:
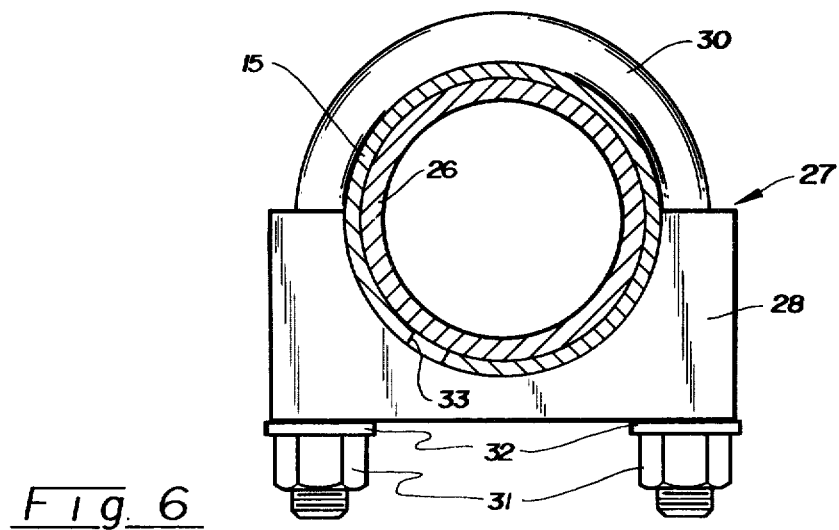
FIG. 6 is a transverse sectional view taken along line 6—6 of FIG. 5.

Mounting of the fender 10 in supported relationship on the vehicle chassis 11 is advantageously accomplished by a telescopic sleeve arrangement as is best seen in FIGS. 5 and 6. This telescopic sleeve assembly comprises the support tube 15 and a second tubular mounting bar 26. The tubular mounting bar 26 is relatively shorter than the support tube and is only insertable within that tube to an extent which will not result in interference with the inner clamping plate 20 that secures the components to the fender panel 12. As can be seen in FIGS. 5 and 6, the mounting bar 26 has an outer diameter which is substantially equal to the inner diameter of the support tube 15. Thus, the two tubular bars may be telescopically interfit as illustrated in these drawings with the mounting bar 26 being of a sufficient length to provide adequate structural support and to permit sufficient axial adjustment that may be necessary to obtain the most advantageous positioning of the fender relative to the wheel set.

A securely fixed interconnection is obtained between the telescoped tubular elements by means of a pair of compression clamps 27. These compression clamps 27 comprise a bracket or saddle 28 having an arcuately curved or U-shaped surface 29 adapted to closely interfit with the exterior curved surface of the tube 15 and a U-bolt 30. The U-bolts 30 also have a radius of curvature at their inner surface portions which is substantially equal to the outer surface of the support tube. Terminal ends of the U-bolt project through the bracket 28 and extend a distance outwardly therefrom to receive the attachment nuts 31. Washers in the form of lock washers 32 may be provided to assure that the assembly will be maintained in a locked configuration. To further assure that an extremely high friction, mechanical interengagement is obtained between the interengaging inner surface of the support tube 15 and outer surface of the mounting bar 26, the support tube is provided with a longitudinally extending slot 33. This longitudinally extending slot is of a length to extend from the terminal end of the bar which is disposed adjacent the vehicle chassis element 11 to a point sufficiently remote therefrom to permit mounting of the compression clamps 27 at an axially intermediate position thereon. The function of the slot is to enable the support tube in the region of the slot to be compressed or collapsed into a secure clamped engagement around the mounting bar 26. This collapsing function is obtained through tightening of the nuts 31 on the ends of the U-bolts 30 to draw the respective brackets and U-bolts toward each other and thus result in the compression of the tubular support tube. This interconnection of the support tube and its associated mounting bar by telescopic sleeve arrangement enables the two components to be adjusted angularly as well as axially as is desired or may be necessary to properly position a fender carried by that support tube in association with a wheel set.

Rigid mechanical interconnection of the mounting bar 26 on the vehicle chassis element 11 is obtained by means of a threaded socket 34 provided in the end of the mounting bar and a cap screw 35. In the illustrative embodiment, the threaded socket 34 is formed by welding of a threaded lock nut 36 to a circular plate 37 which has a circular diameter substantially equal to the interior diameter of the mounting bar 26. This circular plate 37 is then disposed in the end portion of the mounting bar at a point to permit welding of that plate to the interior wall of the mounting bar. Attachment of the mounting bar to the chassis element 11 is then effected by positioning the mounting bar in axial alignment with an aperture formed in the chassis element and inserting the cap screw 35 through the aperture and threading it into the lock nut 36. By tightly drawing the cap screw into the lock nut, the end wall of the mounting bar 26 will be drawn into tight engagement with the vertical surface of the chassis frame element. This engagement is capable of developing adequate frictional faces to prevent relative rotation of the mounting bar when it is once assembled with that chassis element.

Figure 7:
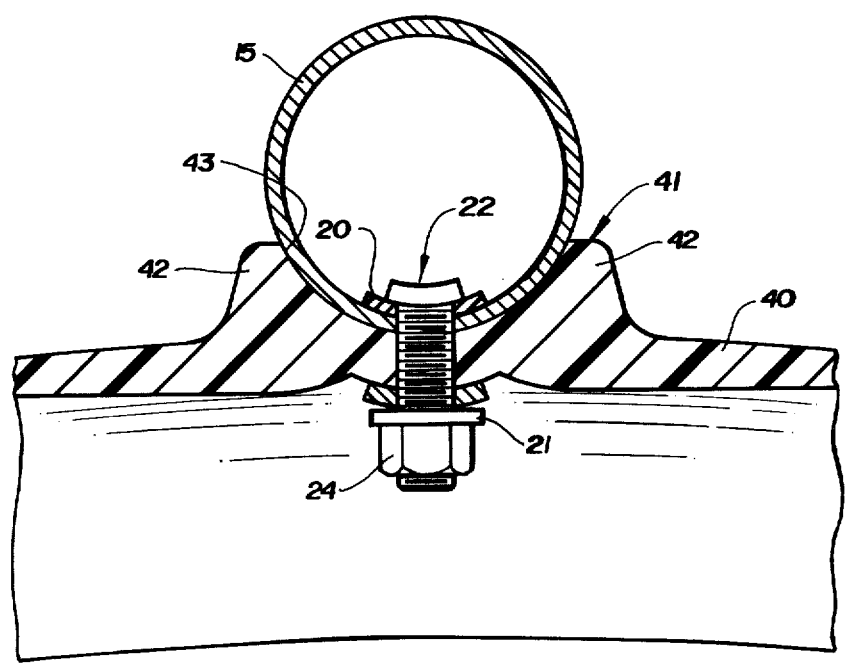
FIG. 7 is a fragmentary sectional view similar to FIG. 2 but showing a modified quarter fender structure.

A modified form of the fender 10 is illustrated in FIG. 7. This modified fender is formed by molding of a suitable plastic material into the desired configuration. A molded plastic structure such as that illustrated in FIG. 7 will have a panel 40 which is of greater thickness than the sheet metal structure previously illustrated and described. Also, this molded structure will have a support tube seat 41 integrally molded into the panel on its outwardly facing surface. As in the previously described embodiment, such seat 41 will include two upstanding ribs 42 extending transversely across the width of the panel. These ribs 42 have an outwardly facing surface which cooperatively define an arcuately shaped channel having a surface configuration also designed to complement that of the support tube 15 and having an arcuate extent of the order of 80 degrees. The opposite wheel set facing surface of the panel 40 is also advantageously configured to have a transversely extending surface 44 that is in alignment with the support seat and which is arcuately configured. The curvature of the surface 44 is preferably the same as the support bar seat 41 and thus enables use of a pair of similarly configured clamping plates 20 and 21 in the manner as described with the first illustrated embodiment. A fastening device 22 of the same type is also utilized with this modified structure.

It will be readily apparent from the preceding description of two illustrative embodiments of this invention that a substantially improved fender and support or mounting for such fender has been provided. The mechanical interconnection of a tubular support tube and a fender panel by means of the rigid mechanical coupling results in a fender assembly that is rigidly interconnected and which may be more readily maintained in a desired position when mounted on a vehicle chassis. The elimination of the U-bolt type of attachment heretofore employed not only eliminates the undesirable appearance of such an assembly and thus enhances the aesthetic appearance, but the resulting mechanical structure is such that the proper positioning of the fender panel can be better assured. The tubular sleeve assembly mounting of the support bar for interconnection with the vehicle chassis results in a secure attachment which requires use of only a single compression type clamping device. Proper positioning of the fender with either axial or rotational adjustment or a combination is readily accomplished. The fender when once positioned, is easily clamped into a secure position by means of the compression clamps. It is also important to note that the interconnection of the tubular support bar by means of the clamping plates with the bar positioned in a support seat results in an assembly wherein there is little tendency, if any, for oscillatory movement as between the bar and the fender panel.

Having thus described this invention, what is claimed is:

1. A fender and support bar therefor for an automotive vehicle wheel set comprising
    a rigid panel adapted to be supported adjacent a vehicle wheel set to intercept material thrown peripherally therefrom and being of a width substantially equal to that of the wheel set and of a longitudinal dimension sufficient to cover a predetermined peripheral extent of that wheel set, said panel having a wheel set facing surface and an opposite outwardly facing surface and formed with a transversely extending, elongated channel-form support bar seat disposed intermediate its longitudinally spaced ends, said support bar seat formed in one of said panel surfaces and having a surface of predetermined configuration,
    an elongated, tubular support bar positioned in said support bar seat and extending transversely across said panel and projecting a distance laterally from one longitudinal side of said panel for interconnection with and supported mounting on a vehicle chassis, said support bar having a surface conformation complementary to said support bar seat surface, and
    connecting means for mechanically interconnecting said panel and said support bar into a rigidly assembled structure, said connecting means including
    (1) an elongated inner clamping plate extending axially through the interior of said support bar and disposed in contacting engagement with an interior wall surface of that portion of said support bar which is disposed in said support bar seat, and
    (2) a plurality of fastening devices disposed in axially spaced relationship along said clamping plates and operatively coupled therewith to mechanically clamp said plates, panel and support bar into rigidly secured relationship.

2. A fender and support bar according to claim 1 wherein said inner clamping plate has a bar contacting surface that is of a configuration complementary to the inner wall surface of said support bar.

3. A fender and support bar according to claim 1 wherein said connecting means includes an elongated outer clamping plate extending transversely across said panel in axial alignment with said support bar seat surface and said inner clamping plate and is in contacting engagement with said panel surface.

4. A fender and support bar according to claim 3 wherein said outer clamping plate has a panel contacting surface that is of a configuration complementary to the panel surface.

5. A fender and support bar according to claim 1 wherein said fastening devices each comprise a rod secured to said inner clamping plate in fixed relationship and projecting through coaxial apertures formed in said support bar and said panel.

6. A fender and support bar according to claim 5 wherein each of said fastening device rods is formed with screw threads and a nut is threaded onto the end thereof projecting beyond the opposite surface of said panel.

7. A fender and support bar according to claim 1 wherein said support bar seat surface is arcuately curved and said support bar is a cylindrical tube having a same arcuate curvature.

8. A fender and support bar according to claim 7 wherein said support bar and cylindrical tube have a contact surface that is of the order of 80 degrees of their respective arcs of curvature.

9. A fender and support bar according to claim 7 wherein the surface of said panel opposite that surface having said support bar seat formed therein has an arcuately curved portion formed to receive an elongated outer clamping plate, the curvature of such portion being substantially the same as the curvature of said support bar seat surface and said outer clamping plate extends transversely across said panel in axial alignment with said support bar seat surface and said inner clamping plate and is in contacting engagement with said panel surface.

10. A fender and support bar according to claim 1 or 9 wherein said support bar seat is formed in the outwardly facing surface of said panel.

11. A fender and support bar according to claim 1 wherein said panel is formed from sheet metal and is shaped to define said support bar seat.

12. A fender and support bar according to claim 1 wherein said panel is molded from a plastic material and said support bar seat is integrally molded therewith.

13. A fender and support bar according to claim 1 which includes a mounting bar telescopically received within the end portion of said tubular support bar projecting laterally from said panel and securing means for maintaining said two bars in mechanically fixed relationship, said mounting bar having attaching means for mechanically connecting with a vehicle chassis.

14. A fender and support bar according to claim 13 wherein said support bar has a longitudinally extending slot formed in the end portion thereof receiving said mounting bar and said securing means comprises a clamp mechanism operable to compress said support bar into frictional gripping engagement with said mounting bar.

15. A fender and support bar according to claim 14 wherein said clamp mechanism includes at least one U-shaped bolt and U-shaped clamp bar positionable on said support bar in substantially complete circumscribing relationship.

16. A fender and support bar according to claim 13 wherein said mounting bar attaching means comprises a screw threaded socket formed in the end thereof for axially receiving a cap screw.

17. A fender and support bar according to claim 16 wherein said screw threaded socket includes means for forming a self-locking engagement with a cap screw that is threaded therein.

* * * * *